United States Patent [19]

Brown et al.

[11] Patent Number: 5,937,800
[45] Date of Patent: Aug. 17, 1999

[54] METHOD FOR ENABLING A SUBSTANTIALLY CONSTANT TOTAL FUEL ENERGY RATE WITHIN A DUAL FUEL ENGINE

[75] Inventors: Scott C. Brown, Peoria, Ill.; Geoffrey D. Ginzel, Lafayette, Ind.

[73] Assignee: Caterpillar Inc., Peoria, Ill.

[21] Appl. No.: 09/036,199

[22] Filed: Mar. 6, 1998

[51] Int. Cl.$^6$ ................................ F02B 3/00; F02B 13/00
[52] U.S. Cl. ...................... 123/27 GE; 123/575; 123/357
[58] Field of Search ................................ 123/27 GE, 575, 123/525, 527, 357, 352

[56] References Cited

U.S. PATENT DOCUMENTS

| | | | |
|---|---|---|---|
| 4,597,364 | 7/1986 | Young | 123/27 GE |
| 4,641,625 | 2/1987 | Smith | 123/575 |
| 4,955,326 | 9/1990 | Helmich | 123/27 GE |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,355,854 | 10/1994 | Aubee | 123/27 GE |
| 5,370,097 | 12/1994 | Davis | 123/27 GE |
| 5,398,724 | 3/1995 | Vars et al. | 137/625.33 |
| 5,450,829 | 9/1995 | Beck | 123/435 |
| 5,526,786 | 6/1996 | Beck et al. | 123/357 |
| 5,628,294 | 5/1997 | Krieckaert et al. | 123/525 |
| 5,806,490 | 9/1998 | Nogi et al. | 123/527 |

*Primary Examiner*—Thomas N. Moulis

[57] ABSTRACT

A method for delivering liquid fuel and gaseous fuel to a dual fuel engine operating in a dual fuel mode includes establishing a governor output value indicative of a total fuel energy rate desired to be delivered to the engine to maintain a desired engine speed. A first value indicative of a liquid pilot fuel energy rate desired to be delivered to the engine and a second value indicative of a gaseous fuel energy rate desired to be delivered to the engine are each determined such that the sum of the desired liquid pilot fuel energy rate and the desired gaseous fuel energy rate is substantially equal to the desired total fuel energy. A stored gaseous fuel energy content can be updated to assure continued accuracy of the fuel control system of the dual fuel engine.

13 Claims, 3 Drawing Sheets

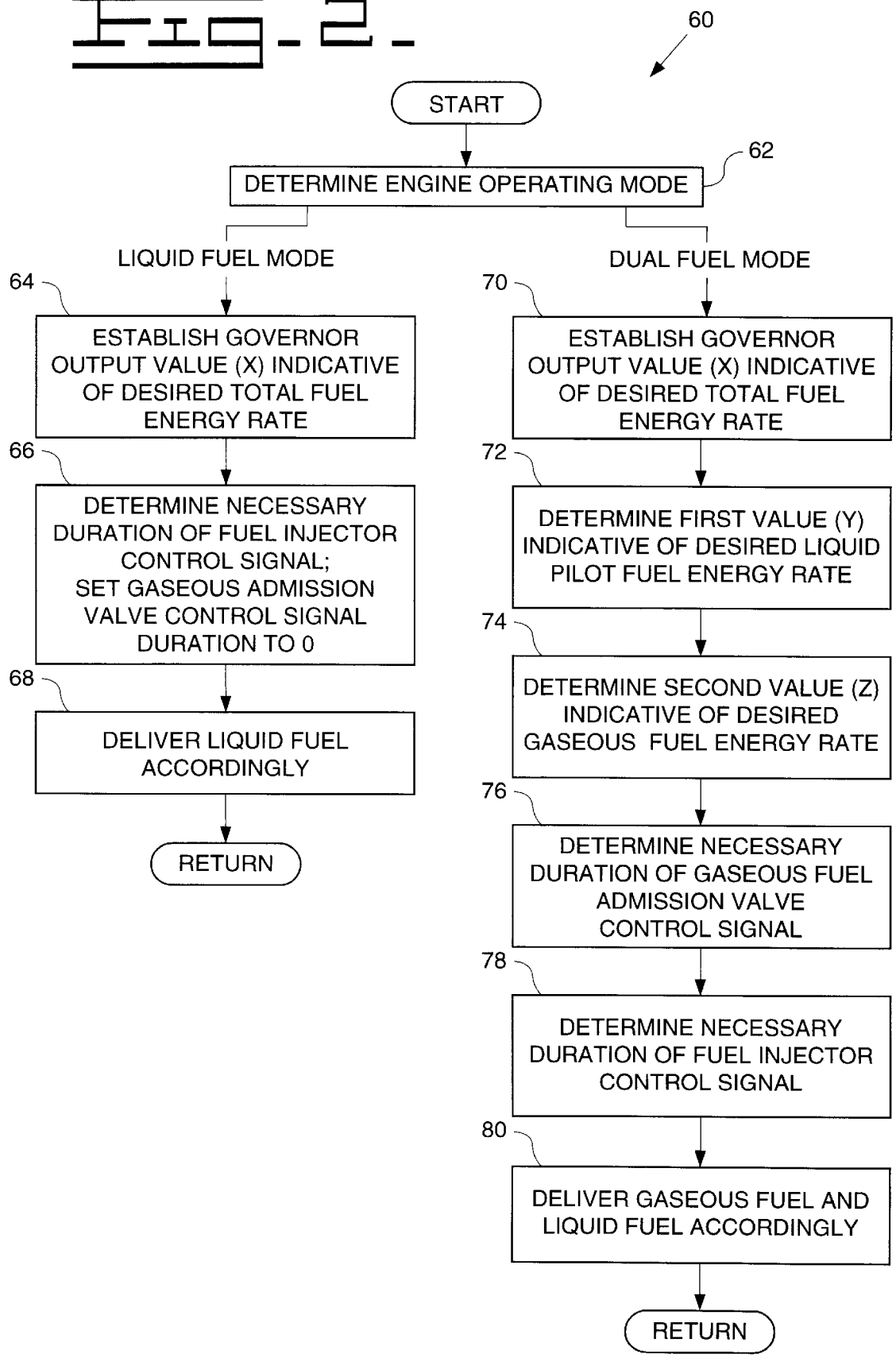

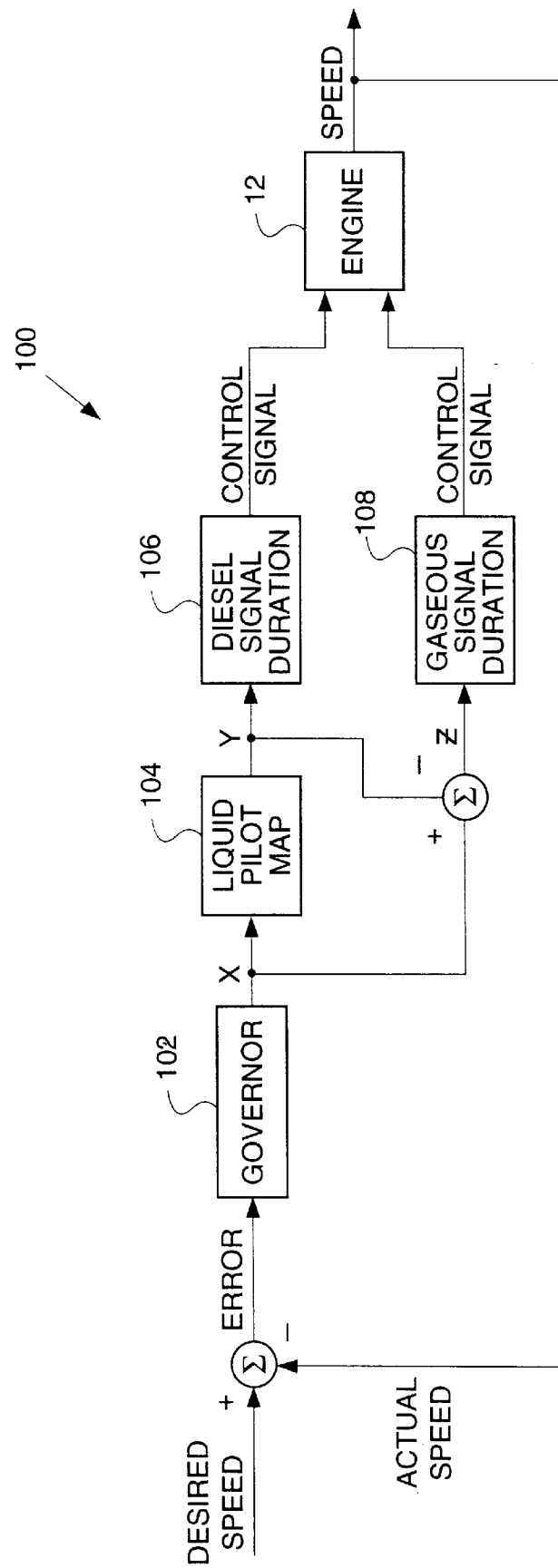

METHOD FOR ENABLING A SUBSTANTIALLY CONSTANT TOTAL FUEL ENERGY RATE WITHIN A DUAL FUEL ENGINE

TECHNICAL FIELD

This invention relates generally to dual fuel engines, and more particularly, to a method for delivering gaseous fuel and liquid pilot fuel to the engine during a dual fuel operating mode so as to facilitate maintaining delivery of a substantially constant total fuel energy rate to the engine.

BACKGROUND ART

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount or pilot amount of diesel fuel is injected into the cylinder or the precombustion chamber in order to ignite the mixture of air and gaseous fuel.

A variety of techniques have been used in the past to determine the amount of gaseous fuel to deliver to an engine and the amount of liquid fuel to deliver to the engine during the dual fuel operating mode. For example, some techniques operate by allowing the fuel system governor to adjust the amount of diesel fuel delivered based upon changes in engine speed which occur after the amount of gaseous fuel delivered is changed. These techniques can result in undesired fluctuations in engine speed due to changes in the total fuel energy delivered to the engine.

Another problem encountered in dual fuel engines is that the energy content of gaseous fuel can vary. A fuel delivery method which takes into account the varying energy content of the gaseous fuel would therefore be advantageous.

Accordingly, the present invention is directed to overcoming one or more of the problems as set forth above.

DISCLOSURE OF THE INVENTION

In one aspect of the present invention a method for delivering liquid fuel and gaseous fuel to a dual fuel engine operating in a dual fuel mode includes determining a governor output value indicative of a total fuel energy rate desired to be delivered to the engine to maintain a desired engine speed. A first value indicative of a liquid pilot fuel energy rate desired to be delivered to the engine and a second value indicative of a gaseous fuel energy rate desired to be delivered to the engine are each determined such that the sum of the desired liquid pilot fuel energy rate and the desired gaseous fuel energy rate is substantially equal to the desired total fuel energy.

In another aspect of the present invention a method of utilizing a governor of a dual fuel engine system to control fuel delivery in both a liquid fuel mode of operation and a dual fuel mode of operation is provided. During operation of the engine in the liquid fuel mode an actual engine speed is sensed and compared with a desired engine speed. A governor output value indicative of a total fuel energy rate desired to be delivered to the engine in order to maintain the desired engine speed is established based upon the comparison and liquid fuel is delivered to the engine in an amount which provides the desired total fuel energy rate. During operation of the engine in the dual fuel mode an actual engine speed is sensed and compared with a desired engine speed. A governor output value indicative of a total fuel energy rate desired to be delivered to the engine in order to maintain the desired engine speed is established based upon the comparison. Liquid fuel is delivered to the engine in an amount which provides a first fuel energy rate and gaseous fuel is delivered to the engine in an amount which provides a second fuel energy rate such that the sum of the first fuel energy rate and the second fuel energy rate is substantially equal to the desired total fuel energy rate.

The present invention thus provides a method for engine speed governing by utilizing the output of the liquid fuel governor to maintain delivery of a substantially constant total fuel energy rate to the engine as between a liquid fuel mode and a dual fuel mode, assuming the engine load is substantially the same. Because liquid fuel has a substantially constant energy content, the output of the liquid fuel governor, whether the engine is operating in a liquid fuel mode or a dual fuel mode, is indicative of a total fuel energy rate desired to be delivered to the engine. In the dual fuel mode calculations can be used to split the desired total fuel energy rate between a first fuel energy rate provided by the liquid pilot fuel delivered and a second fuel energy rate provided by the gaseous fuel delivered.

BRIEF DESCRIPTION OF THE DRAWINGS

For a better understanding of the present invention, reference may be made to the accompanying drawings in which:

FIG. 2 is a flowchart of operating steps for the dual fuel engine system of FIG. 1 in accordance with the present invention; and FIG. 3 is a control diagram of the present invention.

BEST MODE FOR CARRYING OUT THE INVENTION

Figure 1:
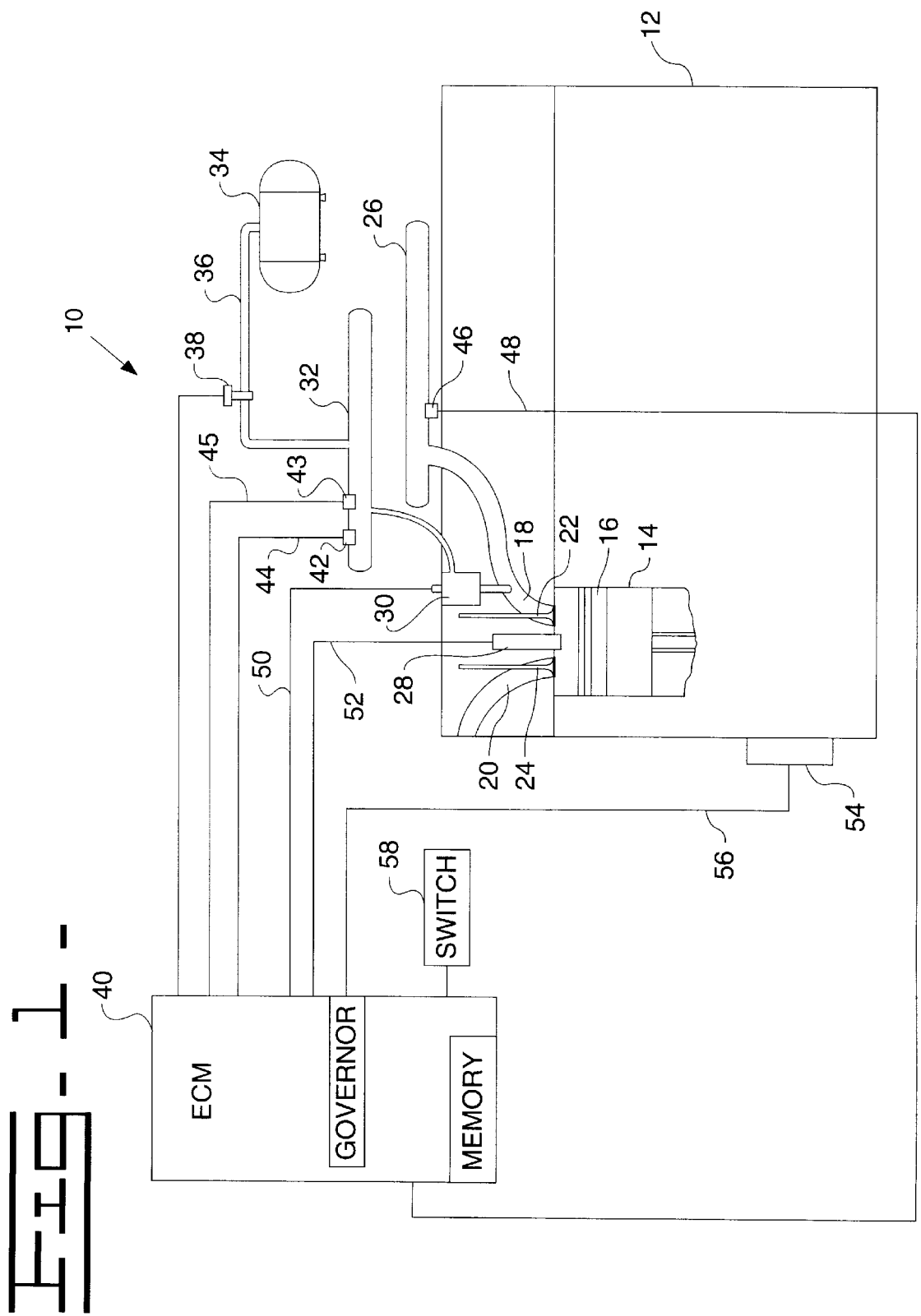
FIG. 1 is a schematic view of a dual fuel engine system in accordance with the present invention.

Referring to the drawings, numeral 10 in FIG. 1 depicts a dual fuel engine system used including an engine 12 with a representative cylinder 14 shown. Although only one cylinder 14 is shown, it is recognized that number of cylinders of engine 12 could vary and that engine 12 could be of the in-line type, v-type, or even a rotary type engine. Piston 16 is positioned for displacement within cylinder 14, which cylinder 14 includes an intake port 18 and an exhaust port 20 including respective valves 22 and 24. Intake port 18 receives air from air intake manifold 26 to which intake air travels after passing through, for example, an air filter (not shown) and turbocharger (not shown). Engine 12 includes a fuel injector 28, such as an electronic unit injector, positioned for injecting liquid fuel, such as diesel fuel, into cylinder 14. The liquid fuel may be provided to fuel injector 28 by means commonly known in the art. A gaseous fuel admission valve 30 is positioned between a gaseous fuel manifold 32 at an upstream side and intake port 18 at a downstream side, a nozzle portion of valve 30 extending into intake port 18 for delivering gaseous fuel thereto. Gaseous fuel admission valve 30 may, for example, be of the type shown and described in U.S. Pat. No. 5,398,724 available from Woodward Governor Company. Gaseous fuel manifold 32 is connected to a source of gaseous fuel 34 by fuel path 36, a solenoid operated gaseous fuel shut off valve 38 being positioned along fuel path 36. Although not shown, it is recognized that such a system might typically include a balance regulator positioned between gaseous fuel source 34 and gaseous fuel manifold 32 for regulating the gaseous fuel pressure at the upstream side of gaseous fuel admission valve 30.

An electronic control module (ECM) 40 is connected to a gaseous fuel pressure sensor 42 via conductive path 44 and to an intake air pressure sensor 46 via conductive path 48 for receiving pressure indicative signals from each of such sensors. Such pressure sensors are well known in the art and therefore a detailed description of the sensors is not included herein. A temperature sensor 43 is also provided in gaseous fuel manifold 32 to provide temperature indicative signals to ECM 40 via conductive path 45. ECM 40 is connected for controlling gaseous fuel admission valve 30 by conductive path 50 and is also connected for controlling fuel injector 28 by conductive path 52. In this regard it is know to include driver circuitry within ECM 40 for delivering current control signals to such devices. However, it is recognized that such driver circuitry could be formed separate from, but connected to, ECM 40. An engine speed sensor 54 associated with a camshaft of engine 12 is also connected to ECM 40 via conductive path 56 for delivering engine speed indicative signals thereto. ECM 40 typically includes processing means, such as a microcontroller or microprocessor, associated electronic circuitry such as input/output circuitry, as well as associated memory.

Dual fuel engine system 10 can operate in both a liquid fuel mode and a dual fuel mode. In the liquid fuel mode the liquid fuel is injected into engine cylinder 14 as the sole source of fuel energy during combustion. In a dual fuel mode the gaseous fuel is mixed with air in intake port 18 of cylinder 14 and a small amount or pilot amount of liquid fuel is injected into cylinder 14 in order to ignite the mixture of air and gaseous fuel.

Referring to FIG. 2, a high level flow chart 60 of operating steps in accordance with the present invention is shown. At step 62 the engine mode is determined. The mode of engine operation is typically determined based upon both an operator input, such as by a mode switch 58, as well as monitored engine parameters. If the engine is operating in the liquid fuel mode the governor establishes an output value (X) which is indicative of the liquid fuel rate necessary to maintain a desired engine speed at step 64. The governor, which could be a PID controller, establishes output value (X) based upon a comparison of the actual engine speed and the desired engine speed. The desired engine speed may be a predetermined, stored engine speed or it may be indicated by a throttle setting for example. Because the energy content of a liquid fuel such as diesel fuel is substantially constant, the governor output value (X) is also indicative of a desired total fuel energy rate for maintaining the desired engine speed. The duration of a fuel injector control signal corresponding to the governor output value (X) is determined at step 66 and the gaseous fuel admission valve control signal is set to zero. Liquid fuel is then delivered to engine 12 at step 68 by delivering a control signal of the determined duration to fuel injector 28.

If the engine is operating in the dual fuel mode, at step 70 the governor establishes an output value (X) in the same manner as explained above, which value (X) is indicative of the desired total fuel energy rate to maintain the desired engine speed. A first value (Y) indicative of the desired liquid pilot fuel rate and desired liquid pilot fuel energy rate to be delivered to the engine is determined at step 72. Value (Y) may be calculated, or determined from a map, as a function of engine speed and engine load. A second value (Z) indicative of the desired gaseous fuel energy rate is then determined at step 74. Value (Z) is determined in accordance with the equation Z=X−Y. The duration of a gaseous fuel admission valve control signal necessary to inject gaseous fuel in an amount which provides the desired gaseous fuel energy rate is determined at step 76 and the duration of a fuel injector control signal necessary to inject liquid fuel in an amount which provides the desired liquid pilot fuel energy rate is determined at step 78. The gaseous fuel and liquid pilot fuel are then delivered to engine 12 at step 80 by control signals having the determined durations. Because the desired total fuel energy rate indicative value (X) is split between the liquid pilot fuel energy rate indicative value (Y) and the gaseous fuel energy rate indicative value (Z) in accordance with the equation X=Y+Z, the overall result is delivery of a total amount of fuel which provides the desired total fuel energy rate.

INDUSTRIAL APPLICABILITY

The present invention provides a dual fuel engine in which engine speed control in the dual fuel mode is based upon the same output of the ECM governor which is utilized during operation in the liquid fuel mode. By making appropriate calculations the governor output is correlated to a desired total fuel energy rate and then liquid fuel and gaseous fuel are delivered to the engine in amounts which provide the desired total fuel energy rate. Thus, the present invention provides a substantially constant total fuel energy rate as between a liquid fuel mode of operation and a dual fuel mode of operation, assuming engine load remains the same as between the two modes.

An example of operation in accordance with the present invention is explained with reference to FIG. 3 which is a control diagram 100. As shown, the actual engine speed as sensed from engine 12 is compared with the desired engine speed and governor 102 utilizes the error to establish output value (X) which is indicative of total fuel rate. In this example the fuel rate value (X) has a value in mm of rack. Each mm of rack is correlated to a rate of flow in grams per minute of liquid fuel by multiplying by a predetermined constant $K_1$ (g/mm*min) as follows:

$$FLOW_{RACK} = RACK * K_1 (g/min)$$

The constant $K_1$ may be determined by engine testing. Because the energy content of liquid fuel is substantially constant, a given rack value (X) is also indicative of a total fuel energy rate desired to be delivered to the engine. Liquid pilot fuel map 104 is then utilized to determine liquid pilot rack value (Y) which also corresponds to a rate of flow in grams per minute of liquid fuel. By subtracting value (Y) from value (X) the gaseous rack value (Z) is determined and also corresponds to a rate of flow in grams per minute of liquid fuel. The necessary duration of a fuel injector control signal corresponding to liquid pilot rack value (Y) is determined as a function of rack and engine speed at 106, such as through use of three dimensional map or by making a calculation.

It is also necessary, as shown at control block 108, to determine a gaseous fuel admission valve control signal duration corresponding to gaseous rack value (Z). This can be achieved as follows. First, again note that gaseous rack value (Z) corresponds to a liquid fuel flow rate in grams per minute as follows:

$$FLOW_Z = Z * K_1 (g/min).$$

Because the energy content $E_L(J/g)$ of a liquid fuel such as diesel fuel is substantially constant, gaseous rack value (Z) is also indicative of a desired gaseous fuel energy rate as follows:

$$GASENERGYRATE_Z = Z * K_1 * E_L (J/min).$$

This energy rate value can be converted to an energy per injection value by dividing by the number of injections per engine revolution $N_I$(inj/rev) and dividing by the engine speed S(rev/min) as follows:

$$GASINJECTIONENERGY_Z = [(Z^*K_1^*E_L)/(N_I^*S)](J/inj).$$

Thus, gaseous rack value (Z) is also indicative of a gaseous fuel energy desired to be delivered to the engine because $N_I$ is known and S can be determined from engine speed sensor 54. At this point it is known that the amount of gaseous fuel per injection should have an energy content of $[(Z^*K_1^*E_L)/N_I^*S](J)$. If the energy content of the gaseous fuel is defined as $E_G$ (J/g) then the amount of gaseous fuel which needs to be injected can be determined by dividing by $E_G$ as follows:

$$GASAMOUNT_Z = [(Z^*K_1^*E_L)/(N_I^*S^*EG)](g/inj).$$

Once the desired amount of gaseous fuel to be injected is determined, the duration of the gaseous fuel admission valve control signal necessary to deliver such amount can be determined based upon the known flow characteristics of gaseous fuel admission valve 30 and as a function of the differential pressure across gaseous fuel admission valve 30, the specific gravity of the gaseous fuel, and the temperature of the gaseous fuel. In terms of a gaseous fuel admission valve such as that shown and described in U.S. Pat. No. 5,398,724, the mass flow $F_G$ (g/s) may be defined as:

$$F_G = C\{[(2k)/(k-1)]^*(293.15/T_G)^*S_g^*P_1^2[(P_2/P_1)^{(2/k)} - (P_2/P_1)^{((k+1)/k)}]\}^{1/2}$$

for $P_2/P_1 > 0.544$. $P_1$ is defined as the pressure at the upstream side of the gaseous fuel admission valve; $P_2$ is defined as the pressure at the downstream side of the gaseous fuel admission valve, C is a known valve constant; k is a ratio of the specific heats; $T_G$ is the temperature of the gaseous fuel in degrees Kelvin; and $s_g$ is the gaseous fuel specific gravity relative to air. It is recognized that other gaseous fuel admission valve types may of course have different equations for mass flow. By dividing by the flow rate $F_G$ a gaseous fuel admission valve control signal duration for gaseous rack value (Z) is obtained as follows:

$$GASDURATION_Z = [(Z^*K_1^*E_L)/(N_I^*S^*E_G^*F_G)](s/inj).$$

Further, it may be necessary to calculate a control signal duration based upon gaseous fuel flow when the valve is fully open and then add or subtract a duration correction value ($t_c$) to account for mechanical delays and reduced flow for gaseous fuel admission valve 30 during valve opening and closing. The duration correction value ($t_c$) could be determined from testing of gaseous fuel admission valve 30. It is recognized that a single equation could be derived for determining the duration of the necessary gaseous fuel admission valve control signal from the gaseous rack value (Z) as follows:

$$GASDURATION_Z = [(Z^*K_1^*E_L)/(N_I^*S^*E_G^*F_G)] + t_c.$$

Once the control signal durations are determined ECM 40 effects delivery of each control signal to the fuel injector and gaseous fuel admission valve respectively to deliver liquid fuel and gaseous fuel in amounts such that the sum of the liquid pilot fuel energy rate and the gaseous fuel energy rate is substantially equal to the desired total fuel energy rate.

In order to maintain continued accuracy of the present invention the stored gaseous fuel energy content value ($E_G$) is preferably occasionally updated during engine operation. One manner in which the gaseous fuel energy content can be updated is by using a method in which while operating the engine in a liquid fuel mode a governor output value ($X_{M1}$) indicative of a total fuel energy rate being delivered to the engine is established and stored in memory. The engine is then operated in a dual fuel mode during which a governor output value ($X_{M2}$) indicative of a total fuel energy rate being delivered to the engine is established. The governor output value ($X_{M2}$) is compared with the stored governor output value ($X_{M1}$). The stored gaseous fuel energy content value ($E_G$) is adjusted based upon the comparison between value ($X_{M2}$) and value ($X_{M1}$). The stored gaseous fuel energy content value ($E_G$) is decreased if value ($X_{M2}$) is greater than value ($X_{M1}$) and the stored gaseous fuel energy content value ($E_G$) is increased if value ($X_{M2}$) is less than value ($X_{M1}$). The stored gaseous fuel energy content value ($E_G$) can be increased/decreased by a predetermined amount, such as by a predetermined percentage, or the gaseous fuel energy content can be increased/decreased by an amount which is a function of the difference (D).

Another manner of adjusting the gaseous fuel energy content involves a method in which the actual energy content of the gaseous fuel is calculated directly. Engine 12 is operated in a liquid fuel mode and a governor output value ($X_{M1}$) indicative of the total fuel energy rate being delivered to the engine is established. The governor output value ($X_{M1}$) is stored for later retrieval. A governor output value ($X_{M2}$) is established in the dual fuel mode and a liquid pilot fuel value ($Y_{M2}$) and a gaseous fuel value ($Z_{M2}$) are also established such that $X_{M2} = Y_{M2} + Z_{M2}$. An updated gaseous fuel energy content value ($E_G'$) can then be determined in accordance with the following equation:

$$E_G' = (E_G)^*(X_{M1} - Y_{M2})/(Z_{M2}).$$

Yet another manner in which the actual gaseous fuel energy content can be calculated includes establishing a governor output value ($X_{M1}$) indicative of the total fuel energy rate while the engine is operating in the dual fuel mode. Corresponding liquid pilot fuel value ($Y_{M1}$) and gaseous fuel value ($Z_{M1}$) are also established such that $X_{M1} = Y_{M1} + Z_{M1}$. The value ($Y_{M1}$) and the value ($Z_{M1}$) are stored in memory for later retrieval. The liquid pilot fuel value ($Y_{M1}$) is increased/decreased by a predetermined amount to ($Y_{M2}$). This change will result in a new gaseous fuel value ($Z_{M2}$) and, if the stored gaseous fuel energy value ($E_G$) is incorrect, a new governor output value ($X_{M2}$) such that $X_{M2} = Y_{M2} + Z_{M2}$. An updated gaseous fuel energy content value ($E_G'$) can then be calculated in accordance with the following equation:

$$E_G' = (E_G)^*(Y_{M1} Y_{M2})/(Z_{M2} - Z_{M1}).$$

Still another method for updating the stored gaseous fuel energy content value ($E_G$) involves monitoring the $O_2$ level within the exhaust gases. A governor output value (X) is established in the dual fuel mode and the actual engine speed is also determined. The desired exhaust gas $O_2$ level is determined, such as from a 3-D map of exhaust gas $O_2$ level as a function of governor output value (X) and the sensed engine speed. The actual exhaust gas $O_2$ level, as sensed from an $O_2$ sensor, is compared with the desired exhaust gas $O_2$ level. The stored gaseous fuel energy content value ($E_G$) is adjusted based upon the comparison. In particular, if the actual exhaust gas $O_2$ level is greater than the desired exhaust gas $O_2$ level the stored gaseous fuel energy content value ($E_G$) will be adjusted downward and if the actual exhaust gas $O_2$ level is less than the desired exhaust gas $O_2$ level the stored gaseous fuel energy content value ($E_G$) will be adjusted upward.

Although the stored gaseous fuel energy content utilized in the present invention has been described as an energy content per unit mass (J/g), it is recognized that the stored energy content could be an energy content per unit volume (J/m$_3$) if a suitable conversion constant is utilized. It is also anticipated that steps in accordance with the present invention could be incorporated into the processing means of ECM 40 using a variety of known programming techniques.

Other aspects, objects and advantages of the present invention can be obtained from a study of the drawings, the disclosure and the appended claims.

We claim:

1. A method for delivering liquid fuel and gaseous fuel to a dual fuel engine operating in a dual fuel mode, the method comprising the steps of:
   (a) establishing a governor output value indicative of a total fuel energy rate desired to be delivered to the engine to maintain a desired engine speed;
   (b) determining a first value indicative of a liquid pilot fuel energy rate desired to be delivered to the engine and a second value indicative of a gaseous fuel energy rate desired to be delivered to the engine such that the sum of the desired liquid pilot fuel energy rate and the desired gaseous fuel energy rate is substantially equal to the desired total fuel energy rate of step (a); and
   (c) delivering gaseous fuel to the engine in an amount which provides the desired gaseous fuel energy rate and delivering liquid fuel to the engine in an amount which provides the desired liquid pilot fuel energy rate.

2. The method, as set forth in claim 1, wherein step (a) includes:
   sensing an actual engine speed;
   comparing the actual engine speed to the desired engine speed; and
   producing the governor output value based upon the comparison.

3. The method, as set forth in claim 2, wherein the governor output value is indicative of a total liquid fuel flow rate necessary to maintain the desired engine speed if no gaseous fuel is delivered to the engine.

4. The method, as set forth in claim 2, wherein step (b) includes:
   determining the first value as a function of at least engine speed and engine load;
   determining the second value as a difference between the governor output value and the first value.

5. The method, as set forth in claim 2, wherein step (c) includes:
   determining a fuel injector control signal duration necessary to deliver liquid fuel in the amount which provides the desired liquid pilot fuel energy rate; and
   determining a gaseous fuel valve control signal duration necessary to deliver gaseous fuel in the amount which provides the desired gaseous fuel energy rate.

6. The method, as set forth in claim 5, wherein step (c) includes:
   sensing a first pressure at an upstream side of a gaseous fuel admission valve;
   sensing a second pressure at the downstream side of the gaseous fuel valve;
   determining the gaseous fuel valve control signal duration as a function of at least the first pressure, the second pressure, the second value, engine speed, and a gaseous fuel energy content value.

7. The method, as set forth in claim 6, wherein the gaseous fuel energy content value is a stored value, the method comprising the further step of:
   (d) adjusting the stored gaseous fuel energy content value to account for variations in the energy content of the gaseous fuel delivered to the engine.

8. A method of utilizing a governor of a dual fuel engine system to control fuel delivery in both a liquid fuel mode and a dual fuel mode, the method comprising the steps of:
   (a) operating the engine in a liquid fuel mode which includes the steps of:
      (i) sensing an actual engine speed;
      (ii) comparing the actual engine speed with a desired engine speed;
      (iii) establishing a governor output value indicative of a total fuel energy rate desired to be delivered to the engine in order to maintain the desired engine speed;
      (iv) delivering liquid fuel to the engine in an amount which provides the desired total fuel energy rate of step (a)(iii);
   (b) operating the engine in a dual fuel mode which includes the steps of:
      (i) sensing an actual engine speed;
      (ii) comparing the actual engine speed with a desired engine speed;
      (iii) establishing a governor output value indicative of a total fuel energy rate desired to be delivered to the engine in order to maintain the desired engine speed;
      (iv) delivering liquid fuel to the engine in an amount which provides a first fuel energy rate and delivering gaseous fuel to the engine in an amount which provides a second fuel energy rate such that the sum of the first fuel energy rate and the second fuel energy rate is substantially equal to the desired total fuel energy rate of step (b)(iii).

9. The method, as set forth in claim 8, wherein the governor output value of step (a)(iii) and the governor output value of step (b)(iii) are established by a PID governor.

10. The method, as set forth in claim 8, wherein step (b)(iv) includes:
    determining a fuel injector control signal duration necessary to deliver liquid fuel in the amount which provides the first fuel energy rate; and
    determining a gaseous fuel valve control signal duration necessary to deliver the gaseous fuel amount which provides the second fuel energy rate.

11. The method, as set forth in claim 10, wherein step (b)(iv) includes:
    sensing a first pressure at an upstream side of a gaseous fuel admission valve;
    sensing a second pressure at a downstream side of the gaseous fuel valve;
    determining the gaseous fuel valve control signal duration as a function of at least the first pressure, the second pressure, the second fuel energy rate, engine speed, and a gaseous fuel energy content value.

12. The method, as set forth in claim 11, wherein the gaseous fuel energy content value is a stored value, the method including the step of:
    (c) determining an updated gaseous fuel energy content value and replacing the stored gaseous fuel energy content value with the updated gaseous fuel energy content value.

13. The method, as set forth in claim 8, wherein step (b)(iv) includes:
    determining the first fuel energy rate as a function of at least the actual engine speed and an engine load;
    determining the second fuel energy rate as a difference between the desired total fuel energy rate of step (b)(iii) and the first fuel energy rate.

* * * * *